United States Patent [19]
Halvorsen

[11] Patent Number: 5,174,504
[45] Date of Patent: * Dec. 29, 1992

[54] AIRBLAST FUEL INJECTOR

[75] Inventor: Robert M. Halvorsen, Birmingham, Mich.

[73] Assignee: Fuel Systems Textron, Inc., Walled Lake, Mich.

[*] Notice: The portion of the term of this patent subsequent to May 14, 2008 has been disclaimed.

[21] Appl. No.: 624,080

[22] Filed: Dec. 7, 1990

Related U.S. Application Data

[63] Continuation of Ser. No. 336,856, Apr. 12, 1989, Pat. No. 5,014,918.

[51] Int. Cl.⁵ .............................................. B05B 7/10
[52] U.S. Cl. ................................... 239/410; 239/412; 137/855; 137/860
[58] Field of Search .......... 239/406, 410, 412, 417.3, 239/424.5, 570, 571; 137/855, 860

[56] References Cited

U.S. PATENT DOCUMENTS

| | | | |
|---|---|---|---|
| 2,107,998 | 2/1938 | Rullison | 251/119 |
| 2,191,968 | 2/1940 | Meiser | 277/60 |
| 2,574,865 | 11/1951 | Edwards | 299/118 |
| 2,893,647 | 7/1959 | Wortman | 239/464 |
| 3,310,240 | 3/1967 | Grundman | 239/404 |
| 3,598,321 | 8/1971 | Bobzin | 239/400 |
| 3,684,186 | 8/1972 | Helmrich | 239/400 |
| 3,980,233 | 9/1976 | Simmons et al. | 239/400 |
| 4,754,922 | 7/1988 | Halvorsen et al. | 239/5 |
| 5,014,918 | 5/1991 | Halvorsen | 239/410 |

FOREIGN PATENT DOCUMENTS 1775973 5/1973 Fed. Rep. of Germany.

Primary Examiner—Andres Kashnikow
Assistant Examiner—Karen B. Merritt
Attorney, Agent, or Firm—Flynn, Thiel, Boutell & Tanis

[57] ABSTRACT

An airblast fuel injector tip is provided for reducing fuel vaporization problems as a result of high fuel temperatures without adversely affecting the airblast operational characteristics of the injector tip. The injector tip includes a fuel receiving chamber and an arcuate valve member movable relative to a valve seat member having a fuel discharge port for discharging fuel flow into the fuel receiving chamber as metered by said valve member in dependence on the pressure of fuel. The valve member comprises an arcuate reed-type valve received in a generally cylindrical tubular valve seat insert with the flow area of the fuel discharge port adjustable externally of the valve seat insert for adjusting the valve cracking pressure.

9 Claims, 2 Drawing Sheets

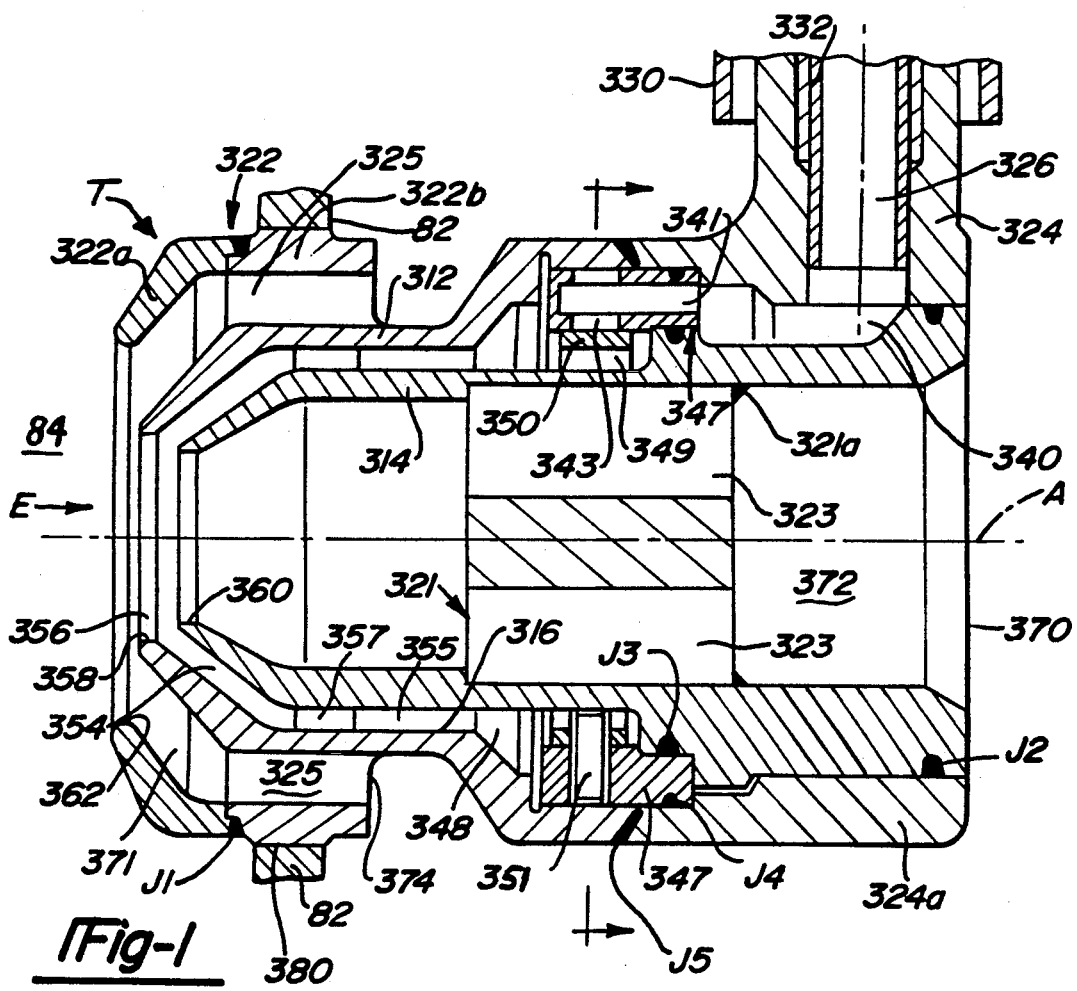
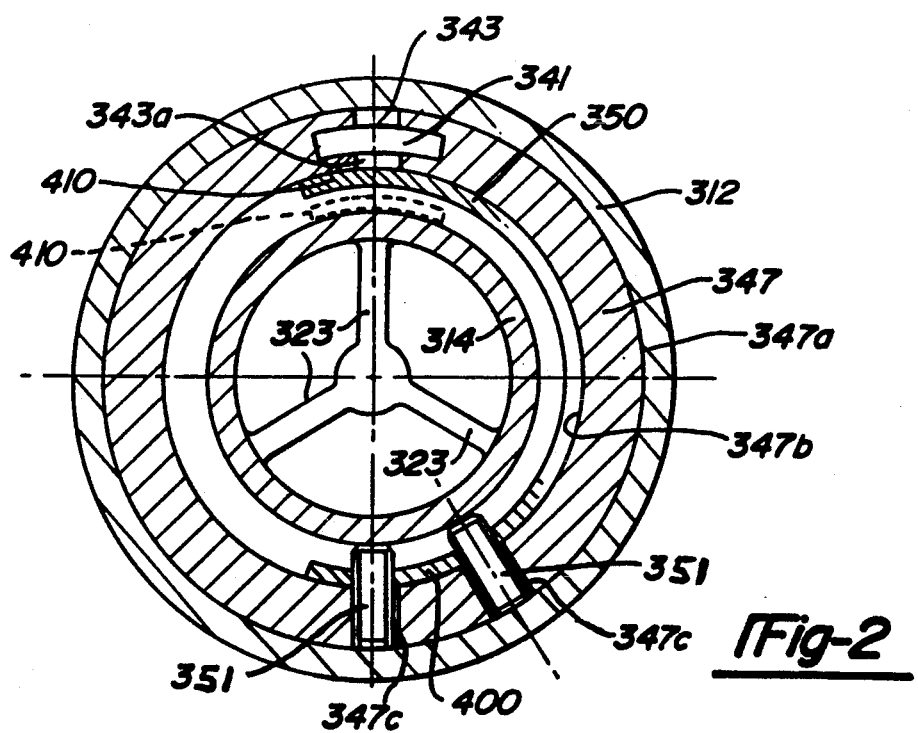

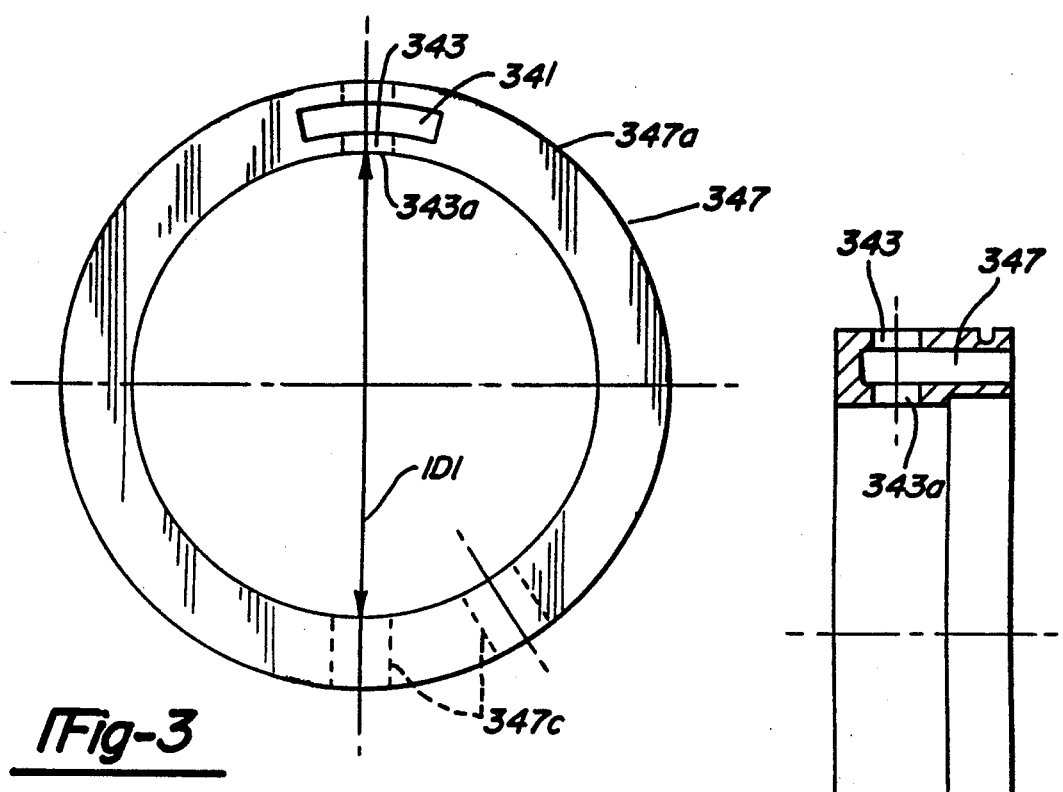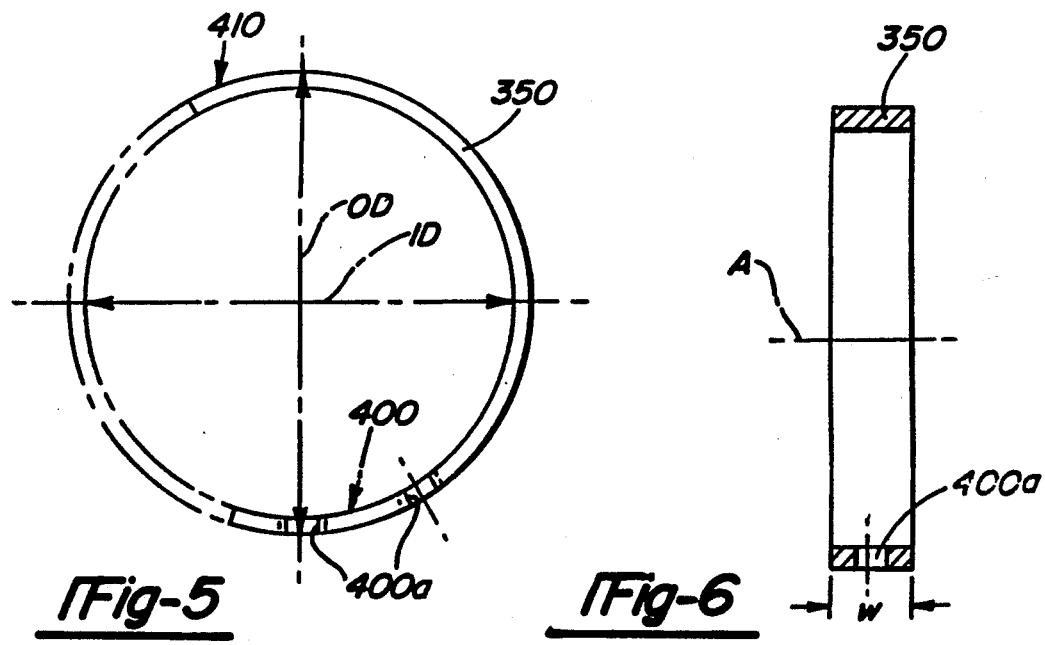

AIRBLAST FUEL INJECTOR

This is a continuation of application Ser. No. 336,856, filed on Apr. 12, 1989, now U.S. Pat. No. 5,014,911.

FIELD OF THE INVENTION

The invention relates to fuel injector constructions especially for gas turbine engines and methods for vapor lock prevention and, in particular, to airblast fuel injector constructions having a special valving configuration in the injector tip near the injector discharge end for providing a high fuel pressure drop to reduce fuel vaporization resulting from high temperatures.

BACKGROUND OF THE INVENTION

U.S. Pat. No. 3,684,186 issued Aug. 16, 1972, to William F. Helmrich discloses in FIG. 2 a known airblast fuel injector for gas turbine engines wherein the injector has generally concentric chambers for inner and outer air flows and intermediate fuel flow and generally concentric discharge orifices for discharging and intermixing inner and outer air flows and the fuel flow. U.S. Pat. No. 3,980,233 issued Sep. 14, 1976, to Harold C. Simmons illustrates an airblast fuel injector of similar construction for a gas turbine engine. Because of the typical low pressure drop of a prior art airblast type injector, such airblast injector has employed a fuel metering valve in a housing on the opposite end of an injector support strut considerably upstream from the injector tip and outside the combustor case to compensate for pressure head effects and provide adequate fuel distribution to the engine combustor. As a result, fuel back pressure is maintained only to a valve which is considerably upstream from the injector tip. The low fuel back pressure at the airblast injector tip, actually from the remote upstream fuel valve to the injector tip, makes the fuel downstream of the valve prone to vaporization when fuel temperature increases as explained in the next paragraph. In addition, the fuel passages downstream from the metering valve to the injector tip are circuitous and often small in size, being prone to vapor lock with adverse consequences as will be explained in the next paragraph.

As mentioned in U.S. Pat. No. 4,754,922, there has been an effort to increase the power (thrust) and efficiency of gas turbine engines especially for military use by raising operating temperature of the hot gas generated in the combustor for subsequent flow to the turbine and past the engine outlet. Although airblast fuel injectors of the type shown in FIG. 2 of the Helmrich U.S. Pat. No. 3,684,186 have performed satisfactorily in the current gas turbine engine where fuel temperature is about 250° F. at the injector tip, initial tests of the same fuel injectors in higher temperature engines where fuel temperature at the injector tip is within the range of 300° F. to 400° F. have evidenced a problem of fuel vaporization in the fuel passages downstream from the fuel metering valve and at the injector tip from the higher temperatures involved. The fuel vaporization results in vapor lock condition in the fuel passages causing pulsing or intermittent interruptions in fuel flow from the injector which in turn causes combustion instability and adversely affects operation of the engine.

Aforementioned U.S. Pat. No. 4,754,922 describes an airblast fuel injector and method for reducing fuel vaporization in an airblast fuel injector tip by positioning a cantilever spring fuel metering valve at an upstream axial location relative to the fuel discharge orifice to reduce fuel vaporization upstream of the valve location and yet provide for formation of a fuel stream amenable to the airblast effect of the inner air stream such that the airblast operational characteristics of the injector are not adversely affected.

U.S. Pat. No. 3,598,321 issued Aug. 10, 1971, to Darrel G. Bobzin illustrates a fuel injector construction for a gas turbine engine having multiple rectilinear leaf spring valves carried on a cylindrical valve plate with each leaf spring valve received in a chordal type slot in the valve plate for controlling fuel flow between cylindrical passages extending from the outer periphery to an inner cylindrical bore in the valve plate. However, the fuel injector disclosed is not an airblast fuel injector and is not exposed to higher fuel temperatures associated with recently developed engines.

U.S Pat. No. 2,107,998 issued Feb. 8, 1938, to E. A. Rullison describes an air valve carburation device wherein a flexible annular reed valve is held on a supporting disk and against a valve seat to control air flow to an engine and is opened by a vacuum condition in the carburetor.

SUMMARY OF THE INVENTION

The invention contemplates an airblast fuel injector useful for reducing fuel vaporization at elevated fuel temperatures.

The invention involves an airblast fuel injector having a longitudinal axis and including injector body means for forming about the axis an inner air chamber with a downstream inner air discharge orifice, an outer air chamber having a downstream outer air discharge orifice and an annular fuel chamber between the inner and outer air chambers with a downstream fuel discharge orifice between the inner and outer air discharge orifices. Means is provided for forming an arcuate valve seat in the fuel chamber with the valve seat including a fuel bore extending transversely of the aforesaid longitudinal axis and terminating in a fuel discharge port on the valve seat. An arcuate spring valve is disposed on the arcuate valve seat and includes a free end portion overlying the fuel discharge port and biased against the valve seat over the fuel discharge port when the fuel pressure is below a minimum selected value and openable in a direction transverse to said axis when fuel pressure exceeds the selected value to allow fuel discharge from the fuel discharge port to the fuel chamber. The free end portion of the valve opens in a transverse direction toward an inner injector body that forms the inner air chamber. Preferably, the inner injector body limits maximum opening of the free end portion of the valve.

Still another embodiment of the invention involves an assembly for use in an airblast fuel injector wherein the assembly includes (a) an annular valve seat member having a cylindrical outer wall and a cylindrical inner wall defining a valve seat and a fuel bore extending radially between the outer wall and inner wall and terminating in a fuel discharge port on the valve seat, and (b) an arcuate spring valve disposed on said valve seat. The spring valve includes an end portion fixed in position relative to said valve seat and an opposite free end portion overlying the fuel discharge port and biased radially against the valve seat when fuel pressure is below a selected value and movable radially away from the fuel discharge port when fuel pressure exceeds the selected value. The cross-sectional flow area of the fuel bore is adjusted to provide the desired valve cracking (opening) pressure.

BRIEF DESCRIPTION OF THE DRAWINGS

FIG. 1 is longitudinal cross-sectional view of one embodiment of an airblast fuel injector tip of the invention.

FIG. 2 is a sectional view taken along line 2—2 of FIG. 1.

FIG. 3 is an end elevation of the valve seat insert member of FIG. 1.

FIG. 4 is a longitudinal cross-sectional view of the valve seat insert member of FIG. 3.

FIG. 5 is an end elevation of the arcuate spring valve member of FIG. 1.

FIG. 6 is a longitudinal cross-sectional view of the valve member of FIG. 5.

DESCRIPTION OF PREFERRED EMBODIMENTS

FIGS. 1-2 illustrate one embodiment of an airblast fuel injector of the invention useful in a higher temperature gas turbine engine having a combustor wall 82.

The airblast fuel injector of this embodiment includes an outer injector body 312 and an inner injector body 314 received in the longitudinal bore 316 of the outer injector body 312 and in the tubular portion 324a of the support strut 324. An air swirler member 321 having swirl vanes 323 is disposed fixedly (e.g., welded at 321a) in the inner injector body 314. A tubular outer shroud 322 is disposed about the outer nozzle body 314. The shroud 322 includes a tubular shroud sleeve 322a welded to an outer tubular shroud sleeve 322b at weld joint J1. The shroud sleeve 322b and swirl vanes 325 are formed on the outer nozzle body 312.

A fuel passage 326 is defined in the support strut 324 which includes the tubular portion 324a welded to the outer nozzle body 312 as will be explained. The tubular portion 324a of the support strut constitutes part of the outer nozzle body 312. External and internal heat shields 330, 332 are provided to form insulating air spaces as shown in FIG. 1.

As shown in FIG. 1, a fuel inlet chamber 340 is formed between the inner injector body 314 and the strut portion 324a to receive fuel from passage 326. The fuel inlet chamber 340 is in fuel flow communication with an axially extending fuel slot or passage 341 in an annular valve seat insert member 347 disposed longitudinally between the inner and outer injector bodies 312, 314. The valve seat member 347 is brazed (at J3, J4) to the injector body 314 and strut portion 324a as shown best in FIG. 1. The valve seat member 347 includes cylindrical outer and inner surfaces 347a, 347b to be received in complementary shaped surfaces of the injector bodies 312, 314 and the strut portion 324a. The outer surface 347a is lightly press fit in the outer injector body 312 to prevent leakage of fuel around the valve seat member 347.

The valve seat member 347 includes the longitudinally extending fuel slot or passage 341 which communicates with a fuel metering cross bore 343 (one or more can be used) that extends radially between the outer and inner surfaces 347a, 347b. The inner end 343a of the fuel cross bore 343 provides a fuel discharge port or aperture for discharging fuel into an annular fuel receiving chamber 349 formed between the injector bodies 312, 314 as permitted by an arcuate, wrap-around, reed type spring valve 350 disposed generally concentrically in the cylindrical bore defined by inner surface 347b relative to the longitudinal axis A of the injector.

As shown best in FIGS. 2 and 5-6, the spring valve 350 comprises an arcuate annular configuration formed of high temperature spring material such as RENE 41 or WASPALOY superalloy heat treatable to exhibit desired spring properties under service conditions. The spring valve 350 can be machined from a cylindrical tubing stock of such material using wire electrical discharge or other machining techniques after the stock is heat treated to develop proper spring properties.

The spring valve 350 includes a free cantilever end portion 410 forming a valve head to overlie the fuel discharge port 343a of the valve seat member 347 and another end portion 400 fixed circumferentially in position between the injector bodies 312, 314 by a plurality of threaded set screws 351 received in threaded holes 400a of the fixed end portion 400 and unthreaded holes 347c of the valve seat member 347. The holes 400a are drilled and threaded prior to heat treatment of the tubing stock.

The spring valve 350 includes an outer diameter (OD) and inner diameter (ID) as well as width (W) controlled to provide the desired spring load and rate control for a given injector application. The outer diameter (OD) of the spring valve 350 is controlled in relation to the inner diameter (ID1) of the cylindrical surface 347b of the valve seat member 347 to provide the desired loading for cracking or opening pressure for the spring valve. As shown best in FIG. 6, the reed-type spring valve 350 includes a rectangular cross-section.

The cracking pressure of the spring valve 350 is adjusted after the spring valve 350 is positioned in a circumferential location relative to the discharge aperture 343a in the valve seat member 347 by set screws 351. The valve 350 is positioned on the valve seat 347 after the valve seat member 347, the support strut 324, the air swirler 321 and inner injector body 314 are brazed together at joints J2, J3, J4. Valve cracking pressure is adjusted using a dummy (simulated) assembly of the shroud 322 (outer air swirler) and outer nozzle body 312 temporarily attached on the inner nozzle body 314 and the strut portion 324a and using a simulated fuel flow for flow testing. The cracking pressure can be adjusted by lapping the inner diameter of the fuel cross bore 343 of the valve seat member 347 to change its effective cross-sectional fuel flow area. The cracking pressure can be adjusted from the exterior of the inner injector body 314 and valve seat 347 by using a suitable lapping tool (not shown) inserted in the cross-bore 343 with the dummy shroud 322 removed. After adjustment of the valve cracking pressure using the simulated fluid flow and lapping of cross-bore 343, the set screws 351 are locked in position by a suitable high temperature adhesive. Thereafter, the assembly of the actual outer shroud 322 and the actual outer nozzle body 312 is positioned on the inner injector body 314. The outer nozzle body 312 is then electron beam welded to the tubular portion 324a of the support strut 324 at joint J5.

The spring valve 350 operates in a valve closed manner below the selected minimum fuel pressure corresponding to the valve cracking pressure to prevent fuel flow from the fuel discharge port or aperture 343a. In particular, as shown in solid lines in FIG. 1, the cantilever valve head portion 410 sealingly abuts or engages the inner surface 347b (forming a valve seat) of the valve seat member 347 over the fuel discharge port 343a to prevent fuel flow. Once the spring valve opens, a predetermined relationship of fuel flow rate versus fuel pressure is obtained over the operational fuel flow range of the injector tip as a result of the controlled spring load and rate of the valve 350. The maximum opening position of the spring valve 350 is limited by engagement of the valve head portion 410 against the inner injector body 314 as shown in phantom in FIG. 2. It is clear that the valve head portion 410 moves in a radially inward direction away from the discharge aperture 344a and toward the inner injector body 314 as it opens in response to fuel pressure increases.

When the valve 350 opens, fuel flows from fuel discharge port 343a into the annular fuel receiving chamber 349 and then to converging conical swirl chamber 348. Fuel from chamber 348 flows to annular chamber 355 past swirl vanes 357 and through annular conical swirl chamber 354 for discharge through orifice 356 (defined by discharge lip 358) in the form of a fuel spray cone.

The fuel discharged from orifice 356 intermixes with inner and outer air discharging past inner and outer discharge lips 360, 362, respectively. Inner air enters the open upstream end 370 of the inner injector body 314 and flows through bore 372 past swirl vanes 323 for discharge from orifice 360. Outer air enters the upstream end 374 of the shroud 322 and flows past air swirl vanes 325 and through air swirling chamber 371 for discharge past lip 362. As is known, the air received in the inner injector body 314 and shroud 322 is received from the upstream compressor (not shown) of the gas turbine engine. Typically, outer shroud 322 includes a mounting surface 380 which is adapted to engage a combustor wall 82 so that the fuel and inner/outer flows are discharged into the internal combustor chamber 84 for burning.

The axial position of the valve member 350 and crossbore 343 along the longitudinal axis A of the injector tip T is located to valve fuel flow in the injector tip in a valve closed manner below a selected minimum fuel pressure (valve cracking pressure) and in a valve metering mode above that fuel pressure with the axial location of the valve member 350 being spaced upstream from discharge end E a selected sufficient axial distance to allow the desired airblast effects on the fuel stream at the fuel discharge orifice, e.g., air filming or atomization action on the fuel on discharge lip 358 at fuel discharge orifice 356, which is essential for satisfactory performance of an airblast fuel injector, and in addition enhanced fuel distribution around the fuel discharge orifice at low fuel flow rates. In particular, inner air flow past discharge lip 360 must be allowed to film or atomize fuel on lip 358 and also by virtue of low pressure generated in fuel chamber 354 from high velocity inner air flow past lips 360 and 358, to improve distribution of fuel in chamber 354, i.e., annularly therearound, at low fuel flow rates where fuel tends to fill chamber 354 in a non-uniform manner dictated by gravity effects. As a result, the axial location of the valve member 350 is selected upstream from discharge end E as shown to permit inner air flow past lip 360 to perform its intended functions in the airblast injector.

The axial location of the valve member 350, and thus valving of the fuel flow, are also important at higher fuel flow rates where the fuel discharging from the fuel slot has a high tangential velocity component with the fuel stream, as a result, tending to immediately form multiple individual fingers of fuel which, if allowed to be present at lip 358, would interfere with or adversely affect filming (atomization) of the fuel by the inner air stream. To provide a fuel stream more amenable in terms of its velocity and configuration to filming or atomization at lip by inner air flow, the axial location of valve member 350 is spaced sufficiently upstream to allow the tangential velocity component of fuel flow to decrease while the axial velocity component increases to reduce the fuel finger effect and provide a swirling, annular fuel stream discharging from orifice 356 which is satisfactory for filming by the inner air flow from lip 360 as well as outer air flow from lip 362.

Thus, the axial location of the valve member 350 and thus of valving of the fuel flow in the valve closed manner below a selected fuel pressure and valve metering manner above that fuel pressure are effective to reduce fuel vaporization without adversely affecting the airblast operational characteristics of the fuel injector.

In addition to axially locating the valve member 350 in the aforesaid selected axial position, fuel passages downstream from the valve member 350 are sized to facilitate egress of any fuel vapor generated therein, especially during low fuel flow rate operation, and thereby avoid vapor lock in the passages Of course, the axial positioning of the valve member 350 also shortens the length of the fuel passages downstream thereof so that fuel vapor has a shorter distance to travel for expellation from the discharge end to also avoid vapor lock therein.

Positioning of the valve member 350 in the injector tip T near the fuel discharge orifice substantially reduces fuel vaporization problems and associated vapor lock upstream thereof by maintaining a higher fuel pressure in the injector tip upstream of the valve member and by shortening the distance between the discharge end E and valve member 350 to facilitate egress of any vapor that might be generated through the relatively uncomplicated and direct-path fuel chambers 348,355,354 to the combustor chamber.

While certain specific and preferred embodiments of the invention have been described in detail hereinabove, those skilled in the art will recognize that various modifications and changes can be made therein within the scope of the appended claims which are intended to include equivalents of such embodiments.

I claim:

1. An airblast fuel injector having a longitudinal axis and comprising injector body means for forming about said axis an inner air chamber with a downstream inner air discharge orifice, an outer air chamber with a downstream outer air discharge orifice and a fuel chamber with a downstream fuel discharge orifice between the inner and outer air discharge orifices, an arcuate valve seat disposed in the fuel chamber, said valve seat including a fuel bore extending transversely of said axis and terminating in a fuel discharge port, and an arcuate spring valve disposed on said arcuate valve seat and having a free end portion overlying the fuel discharge port and biased against said valve seat over the fuel discharge port when the fuel pressure is below a minimum selected value and openable in a direction transverse to said axis when fuel pressure exceeds the selected value to allow fuel discharge from the fuel discharge port to the fuel chamber.

2. The injector of claim 1 wherein said free end portion of said valve is openable in the direction toward an inner injector body that forms said inner air chamber.

3. The injector of claim 2 wherein the inner injector body limits the maximum opening of the valve.

4. The injector of claim 1 wherein said means for forming said valve seat includes an arcuate valve seat insert member disposed between an inner injector body and outer injector body constituting said injector body means, said valve seat insert member having said cylindrical valve seat on the inner periphery thereof.

5. The injector of claim 4 wherein the arcuate valve seat comprises a cylindrical valve seat concentric with said axis and said arcuate valve comprises a partial cylindrical arcuate valve to mate with the valve seat.

6. The injector of claim 4 wherein said spring valve includes a fixed end portion disposed remote from said free end portion.

7. The injector of claim 6 including a set screw for fixedly locating the fixed end portion between the inner injector body and outer injector body.

8. The injector of claim 1 wherein said fuel bore includes a cross-sectional flow area selected to cause the valve to open when fuel pressure exceeds said selected value.

9. The injector of claim 1 wherein the spring valve is a reed valve.

* * * * *